（12） United States Patent
McLean (10) Patent No.: US 7,205,057 B2
(45) Date of Patent: Apr. 17, 2007

(54) INTEGRATED FUEL CELL AND HEAT SINK ASSEMBLY

(75) Inventor: Gerard Francis McLean, West Vancouver (CA)

(73) Assignee: Angstrom Power Inc., North Vancouver, British Columbia (CA)

( * ) Notice: Subject to any disclaimer, the term of this patent is extended or adjusted under 35 U.S.C. 154(b) by 593 days.

(21) Appl. No.: 10/780,970

(22) Filed: Feb. 18, 2004

(65) Prior Publication Data

US 2004/0258970 A1   Dec. 23, 2004

Related U.S. Application Data

(60) Provisional application No. 60/479,787, filed on Jun. 19, 2003.

(51) Int. Cl.
*H01M 8/00*   (2006.01)
*H01M 8/04*   (2006.01)

(52) U.S. Cl. .......................... 429/12; 429/26
(58) Field of Classification Search .................. None
See application file for complete search history.

(56) References Cited

U.S. PATENT DOCUMENTS 5,470,671 A * 11/1995 Fletcher et al. ............ 429/26
5,631,099 A    5/1997  Hockaday ..................... 429/30
5,759,712 A    6/1998  Hockaday ..................... 429/30
5,861,221 A    1/1999  Ledjeff et al. ............... 429/32
5,925,477 A    7/1999  Ledjeff et al. ............... 429/32
6,060,188 A    5/2000  Muthuswamy et al. ....... 429/31
6,127,058 A   10/2000  Pratt et al. ................... 429/30
6,312,846 B1  11/2001  Marsh ........................ 429/30
2002/0011327 A1  1/2002  Fukazu ..................... 165/80.4
2003/0048256 A1  3/2003  Salmon ..................... 345/168
2003/0093995 A1  5/2003  Tadayon ..................... 60/651

FOREIGN PATENT DOCUMENTS

| GB | 2339058 | 1/2000 |
| JP | 8050903 | 2/1996 |
| WO | WO 01/75567 | 10/2001 |
| WO | WO 01/95406 | 12/2001 |
| WO | WO 02/080295 | 10/2002 |

* cited by examiner

*Primary Examiner*—Tracy Dove
*Assistant Examiner*—Helen Chu
(74) *Attorney, Agent, or Firm*—Schwegman, Lundberg, Woessner & Kluth, P.A.

(57) ABSTRACT

The invention is an integrated heat sink fuel cell assembly made of a heat sink assembly with a base and at least one cooling fin extending from the base, at least one connector extending from the heat sink assembly to a heat source, and at least one fuel cell comprising a cathode and an anode integrally disposed within the cooling fin and between the cathode and the anode is an electrolyte.

16 Claims, 8 Drawing Sheets

INTEGRATED FUEL CELL AND HEAT SINK ASSEMBLY

The present application claims priority to U.S. Provisional Patent Application Ser. No. 60/479,787 filed on Jun. 19, 2003.

FIELD

The present invention relates to an integrated heat sink fuel cell assembly.

BACKGROUND

Integrated circuits used for computing, communications, and other information services require electrical power to operate and generate heat as a bi-product of operations. As the density of the integrated circuit has increased according to More's law and as the speed of operation of computing devices has increased, both the power consumed by devices and the heat produced by devices have been increasing.

The increased power consumption of devices taxes the ability of the electronic system of which a device is a component in several ways. First and most obviously, the increased power demand requires a larger power source. In the case of stationary systems, this is not a huge impediment. In portable electronic applications, this increased power demanded from battery systems results in increased weight and/or shorter mission duration for the device. In addition, as system density continues to increase, the overhead associated with the physical distribution of power from a single central source becomes problematic.

The increased heat production of electronic devices requires the installation of ancillary systems on the electronic device itself. Usually the integration of further ancillary systems occurs within the overall packaging of the electronic system. Specifically, heat sinks are required to be attached to electronic chip packages to facilitate cooling. In some cases, the active movement of a coolant, like air, is required by some mechanical means. Once the chip level heat problem is addressed, further systems may be required to provide system level thermal management.

Other electrical devices commonly found in portable electronics also require cooling and are configured with heat sinks.

A need exists within electrical and electronic systems to provide ever increasing levels of power and also to provide ever increasing levels of thermal management, specifically cooling.

A fuel cell is a device that converts chemical energy directly into electrical power through a continuously replenished chemical reaction. Fuel cells are being proposed as an alternative power sources to primary or secondary batteries in portable electronics applications due to the improved performance characteristics of fuel cells in comparison to batteries. Fuel cells are advantageous because of improved energy density and extremely fast recharging (refueling). However, fuel cells proposed for use in portable electronics applications require air breathing cathodes to be continuously fed with oxidant. This requirement can increase system size and complexity. Also, fuel storage and processing options for such fuel cells are limited due to the requirement for consistently low temperature operation. While it is possible to develop very small high temperature devices, obtaining a source of process heat for fuel conditioning and operation requires ancillary systems for burning and consumes fuel. All of these factors detract from the utility of fuel cells as small portable electronic device power supplies.

A need exists within the development of fuel cell systems for electronic devices to integrate the system components with the application in order to minimize the overhead volume and weight associated with ancillary systems. Ideally, the fuel cell and ancillary systems could provide electrical power without consuming any extra volume within the enclosure of the electronics product and without the need for multiple discrete devices to effect the overall conversion from chemical energy stored in a fuel to electrical power for the electronic circuits.

A need exists for an integrated heat sink and fuel cell system in which the waste heat from an active electronic circuit and the volume in which the heat sink conventionally used to dissipate this heat into the environment are used to house a fuel cell system and to provide process heat for various endothermic processes employed in performing the chemical to electrical energy conversion. A need has existed for an invention to provide power to an electronic devise using a fuel stored in an external tank with no extra volume is required to house the fuel cell system. The present invention has been designed to meet these needs.

SUMMARY

The current invention provides an integrated heat sink fuel cell assembly. The integrates assembly includes a heat sink assembly with a base and at least one cooling fin extending from the base, at least one connector extending from the heat sink assembly to a heat source and at least one fuel cell. Each fuel cell has a cathode and an anode integrally disposed within the cooling fin and between the cathode and the anode is an electrolyte.

The invention relates to a method for making an integrated heat sink fuel cell assembly. The method begins by providing a heat sink assembly with a base and a cooling fin extending from the base and, then, creating a channel with two walls in the cooling fin. An Anode is formed in one wall and a cathode is formed in the other wall using a catalyst and then the anode the anode is connected to a fuel plenum and the cathode is connected to an oxygen source. Finally, an electrolyte is disposed in the channel between the anode and the cathode.

BRIEF DESCRIPTION OF THE DRAWINGS

The present invention will be explained in greater detail with reference to the appended Figures.

The present invention is detailed below with reference to the listed figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention relates to an integrated heat sink fuel cell. The integrated heat sink fuel cell system of the present invention has numerous advantages over previous configurations of fuel cell power supplies. With this invention, the volume of the fuel cell is incorporated within the volume of the pre-existing heat sink, so there is no large impediment in terms of volume utilization within the electronic device.

By placing the fuel cell cathodes on the surface of the cooling fins of the heat sink, the cathode air flow and cooling are improved. In some situations, where air is actively moved over the heat sink surface, the cathode stoichiometry can be raised. The heat rejected from the electronic device through the heat sink can be used for fuel reforming, for activation of solid state fuel storage devices, and to maintain fuel cell operations at high temperatures, which allows for use of non-noble metal catalysts.

Figure 1:
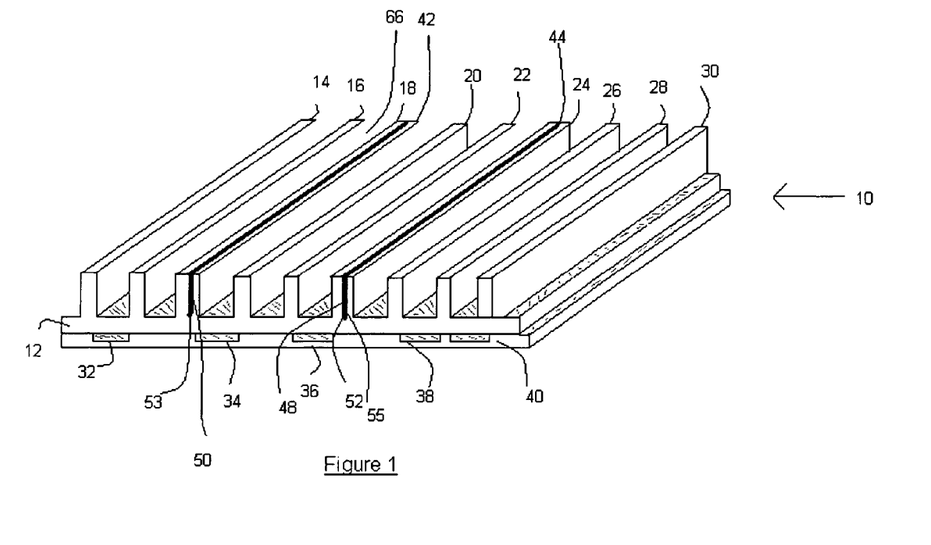
FIG. 1 is a perspective view of an integrated heat sink fuel cell assembly.

With reference to the figures, FIG. 1 depicts the fuel cell assembly. The fuel cell assembly is made of a heat sink assembly (10), at least one connector (32, 34, 36, and 38) extending from the heat sink assembly (10) to a heat source (40), and at least one fuel cell (42 and 44). The connector is preferably a thermally conductive material, such as a thermally conductive metal, like copper, or a thermally conductive polymer such as a filled epoxy.

The heat sink assembly (10) has a base (12) and at least one cooling fin (14, 16, 18, 20, 22, 24, 26, 28, and 30) extending from the base (12). The heat sink assembly with the cooling fins is positioned to interact with air and dissipate heat. The cooling fin (14) can be from about five micrometers to about ten centimeters in height extending from the base (12). In a preferred embodiment, the cooling fin would be between two centimeters and four centimeters from the base (12). One fin could be between 0.5 and 5 millimeters thick and between 1 millimeter and 100 millimeter in length.

In a more preferred embodiment, the fins would be about one millimeter in thickness and about ten millimeters in length. The fins are contemplated to be made from copper or aluminum or alloys thereof. The fins could be composites materials, such of polymer or graphite or filled metal or carbon epoxy composites. Alternatively, oxide filled polymer materials could be used as the fin. In still another embodiment, the fins could be of a laminate structure.

The fuel cell (42 and 44) is made of a cathode (45, 46 and 48) and an anode (50 and 52) integrally disposed within the cooling fin. As seen in FIG. 1, an electrolyte (53 and 55) is located between the cathode (46) and the anode (50). The cathode is located within the cooling fin in order to interact with the air (66) or an oxygen source. A preferred electrolyte can be a perflurosulfonated ionic polymer membrane, such as Nafion™. Another usable electrolyte is an one-aqueous alkaline electrolyte, such as potassium hydroxide. S-PEEK, also known as sulfonaated polyether ether ketone, can be used as the electroyte. High temperature yttrium stabilized zirconium can be used as an electrolyte. Composites of these electrolytes can be used or grafted copolymers can be used as electrolytes.

Figure 2:
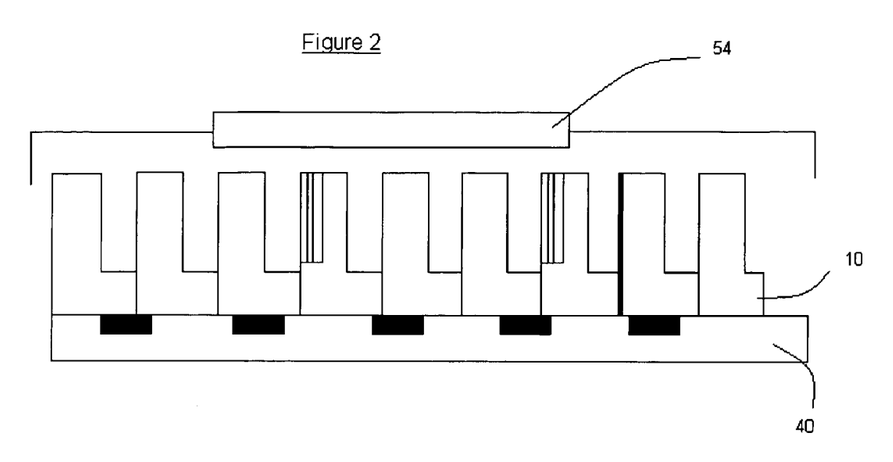
FIG. 2 is a schematic cross sectional view of an integrated heat sink fuel cell assembly with an active air moving device.

As shown in FIG. 2, the integrated heat sink fuel cell assembly can further include an active air-moving device (54) connected to the heat sink assembly (10). The active air-moving device (54) increases airflow over the cooling fin and cathode. The active air-moving device can be a fan or a heat pump. For example, a quiet running five centimeter DC brushless motor fan moving nine cubic feet per minute of air operating on twelve volts manufactured by Startech would be usable herein.

Figure 3:
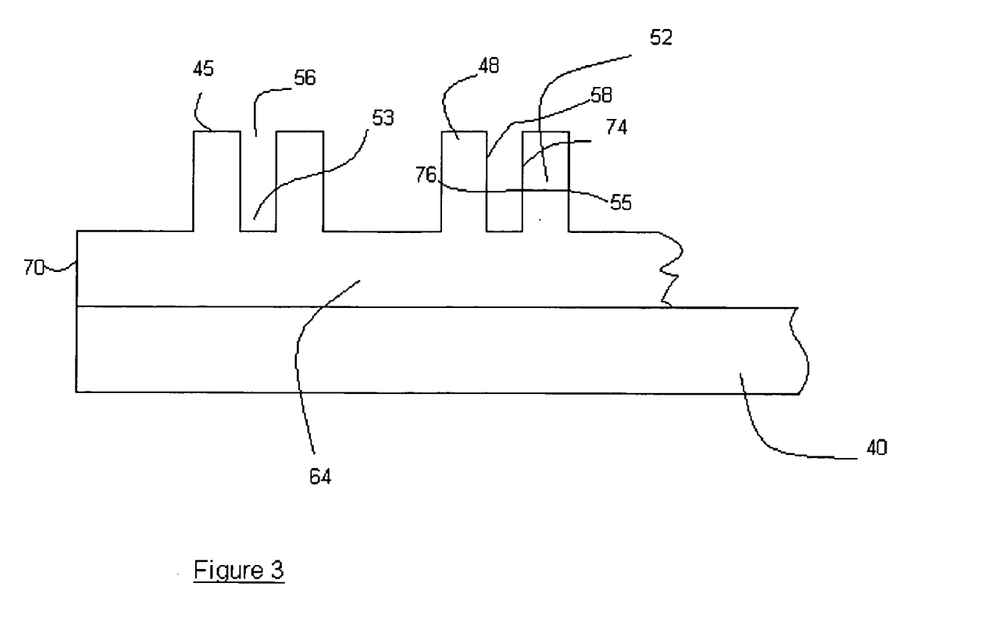
FIG. 3 is a cross sectional view of a portion of an integrated heat sink fuel cell assembly with fuel cells forming channels within the cooling fins.

As seen in FIG. 3, the integrated heat sink fuel cell assembly can also include numerous cooling fins connected to the base with at least one fuel cell in each cooling fin. Each fuel cell in each fin has an anode and a cathode separated by a channel (56 and 58). An electrolyte (53 and 55) is located in the channel. Also, a fuel plenum (64) is located within the heat sink assembly and is in communication with the anode. An oxygen source (not shown) is in communication with the cathodes (46 and 48).

FIG. 3 also shows the channel (58) having a first wall (74) and a second wall (76). The channel can be created by etching, embossing, laser cutting, water jet cutting, micro molding, LIGA processing, deep reactive ion etching, electro discharge machining, or powder packing. In one version of the invention, the channel (58) could have a depth of between 100 microns and 1.5 millimeters, preferably between 400 and 600 microns. The channel (58) is contemplated to have width between one nanometer and one millimeter, more preferably between five microns and seventy-five microns. The channels (56 and 58) can have channel walls.

An anode (52) is formed in the first wall (74) and a cathode (45 and 48) is formed in the second wall (76) using a catalyst The catalyst can be a noble metal catalyst, such as a platinum supported catalyst, or the catalyst can be a platinum catalyst deposited using a thin film technology, such as a pulsed laser deposition, a sputtering deposition, printing, or spraying. Alloys of the noble metal catalyst can also be used. Other catalyst that are useful in the invention include transition metal catalysts, such as chromium, magnesium, and combinations or alloys of these catalysts.

The anode is connected to a fuel plenum (64) and the cathode is connected to an oxidant source. An usable oxidant source could be air in the ambient environment surrounding the heat sink fuel cell.

Figure 4:
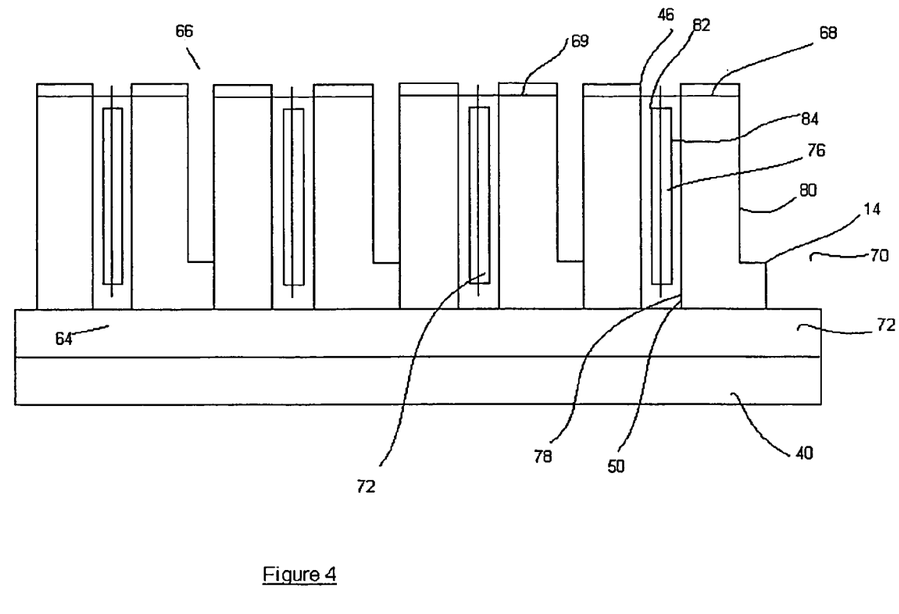
FIG. 4 is a cross sectional view of an integrated heat sink fuel cell assembly with fuel cells formed by adding external membrane assemblies and cathodes to the heat sink fins.

FIG. 4 shows that the cathode in the integrated heat sink fuel cell assembly can be mechanically secured to the cooling fin such as with at least one or two bolts (68 and 69). Tie rods or clips could also be used to secure the fin to the heat sink fuel cell assembly. Alternatively, the cooling fin can be chemically bonded to the heat sink fuel cell assembly. FIG. 4 also shows where the electrolyte can be contained in a membrane assembly (70 and 72). The electrolyte is preferably a perfluoro sulfonate for this embodiment.

In addition, the electrolyte can be a curable liquid electrolyte made of a protonic polymer, a first vinyl monomer capable of dissolving the protonic polymer, and/or a first solvent or a second solvent that are mixed with a cross linking agent having at least two vinyl functionalities.

The invention also relates to a method for making an integrated heat sink fuel cell assembly.

The invention also relates to a second method for making an integrated heat sink fuel cell assembly. The second method starts by providing a heat sink assembly (10) with a base (12) at least one cooling fin (14). FIG. 4 shows the detail wherein the cooling fin has a first side (78) and a second side (80). The fin (14) extends from the base (12). An anode (50) is formed on the first side (78). A membrane assembly (70) is formed with a top (82) and a bottom (84) and attached to the anode (50).

The bottom (84) of the membrane assembly attaches to the anode (50). A cathode (46) is attached to the top (82). Finally, the anode (50) is introduced to the fuel plenum (64) and the cathode (46) is introduced to an oxygen source (66).

Figure 5:
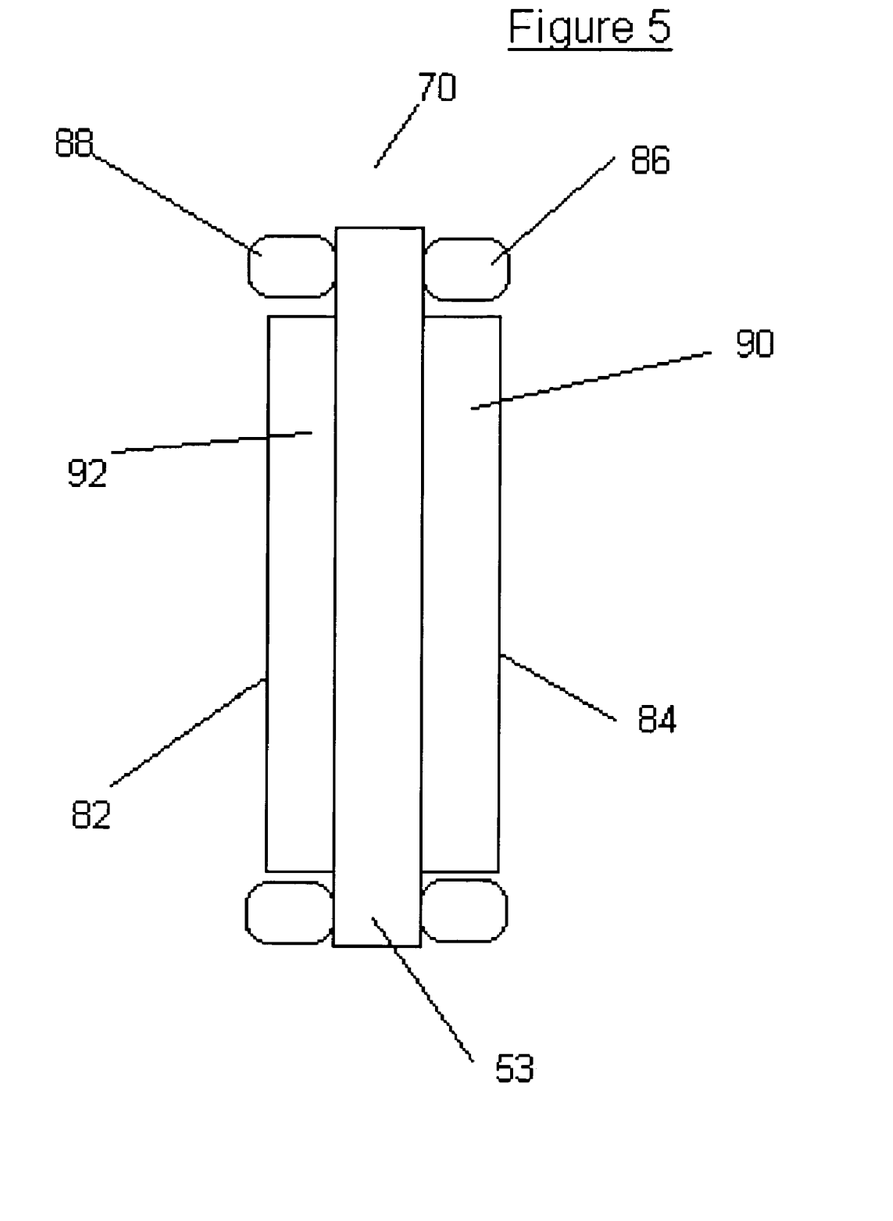
FIG. 5 is a cross sectional schematic view of a membrane assembly.

FIG. 5 is a cross sectional schematic view of a membrane assembly used in the embodiment of FIG. 4. FIG. 5 shows the membrane assembly (70) made of a membrane (53) with a first seal (86), a second seal (88), a first gas diffusion electrode (90), and second gas diffusion electrode (92). The membrane assembly can be a perfluoro sulfonate film.

The invention also relates to a heat sink assembly for a heat source (40). Types of heat sources can include electronic devices, motors, transformers, and solenoids.

Returning to FIG. 1, FIG. 2, and FIG. 3, the figures show a heat source (40) having a heat sink adapted for contacting the heat source (40) with a base (12) and at least one cooling fin (14) extending upwardly from the base, at least one connector (32) extending from the heat sink assembly to the heat source, and to at least one fuel cell (42).

Figure 6:
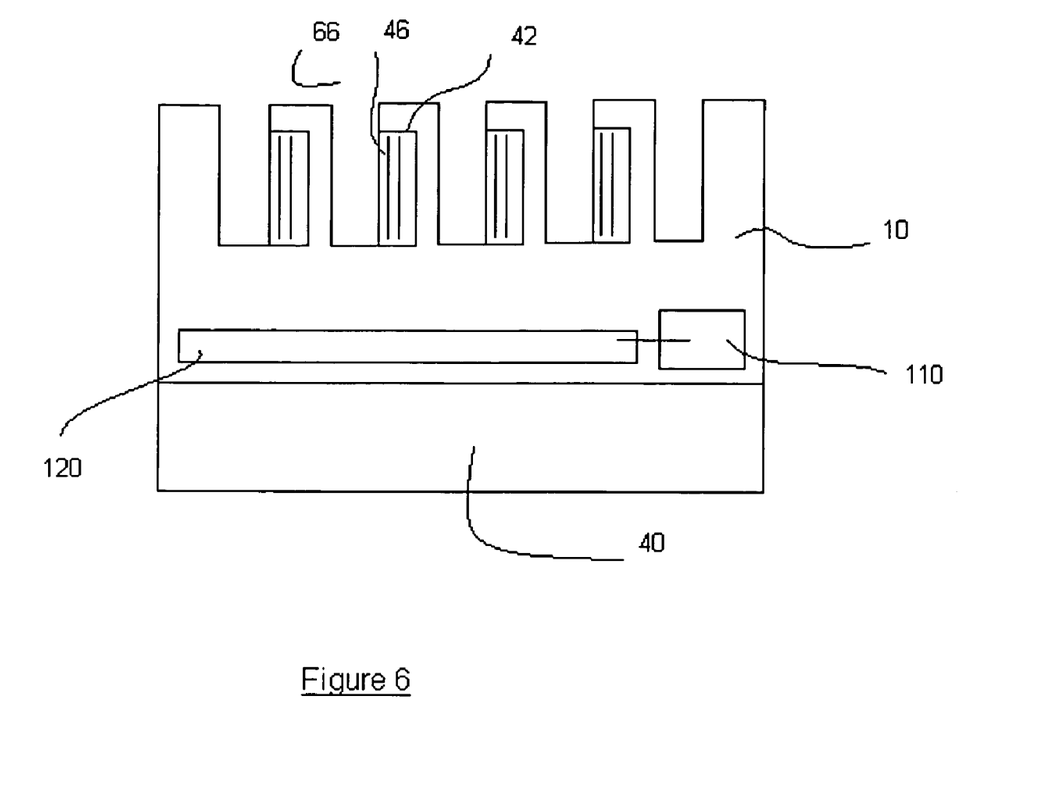
FIG. 6 is another embodiment of the integrated heat sink fuel cell assembly.

FIG. 6 shows a conceptual block diagram of the invention in which all of the components of a fuel cell system are embedded within the heat sink assembly.

In FIG. 6, a fuel cell (42), a fuel processor (110), and a fuel storage device (120) are embedded within heat sink (10). By embedding the fuel cell (42) within the heat sink assembly, an overall reduced system volume is obtained and heat is dissipated from the heat source (40). The dissipated heat can be used to do work in the fuel cell, fuel processor and fuel storage devices. The fuel processor is typically a reformer. The fuel storage device as contemplated could be a tank to contain liquid fuel or solid fuel carriers such as metal hydrides or a fuel storage device, such as a pressure device to contain gaseous fuels stored under pressure. Air is used to remove heat from the heat sink assembly. Air (66) can be used to feed an exposed cathode (46) in the fuel cell (42). While FIG. 6 shows a single fuel cell, multiple fuel cells can be included within the integrated heat sink assembly design.

Figure 7:
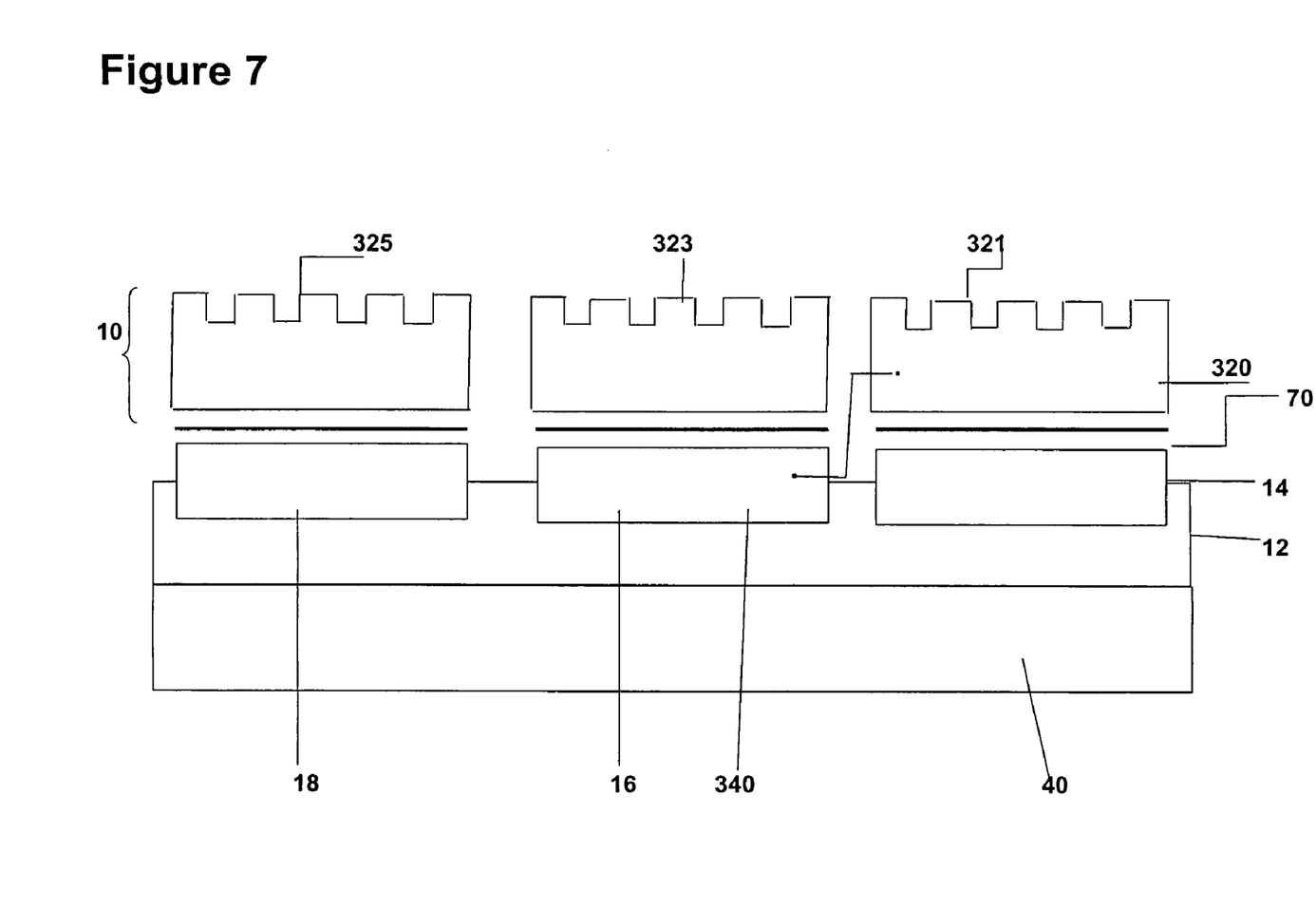
FIG. 7 is another embodiment showing micro fins with cooling channels.

FIG. 7 shows an alternate embodiment in which a conventional fuel cell is placed with the membrane assembly (70) parallel to the heat generating surface (40). The membrane assembly is clamped between cathode flowfield plates (320) and anode flowfield plates (340) that are connected to the fuel plenum (64). The flowfield plates can be made from the same materials as the cathodes and the anodes described above.

The embodiment shown in FIG. 7 incorporates cooling fins (14, 16, and 18) with micro fins (321, 323, 325) disposed over cooling fins (14, 16, and 18) respectively. The micro fins improve airflow over the cathode and cooling of the heat source (40). Neighboring fuel cell cathode flowfield plates (320) can be connected to anode flowfield plates (340) to provide an arbitrary combination of series and electrical connection of the fuel cells included in the overall integrated heat sink fuel cell assembly (10).

Figure 8:
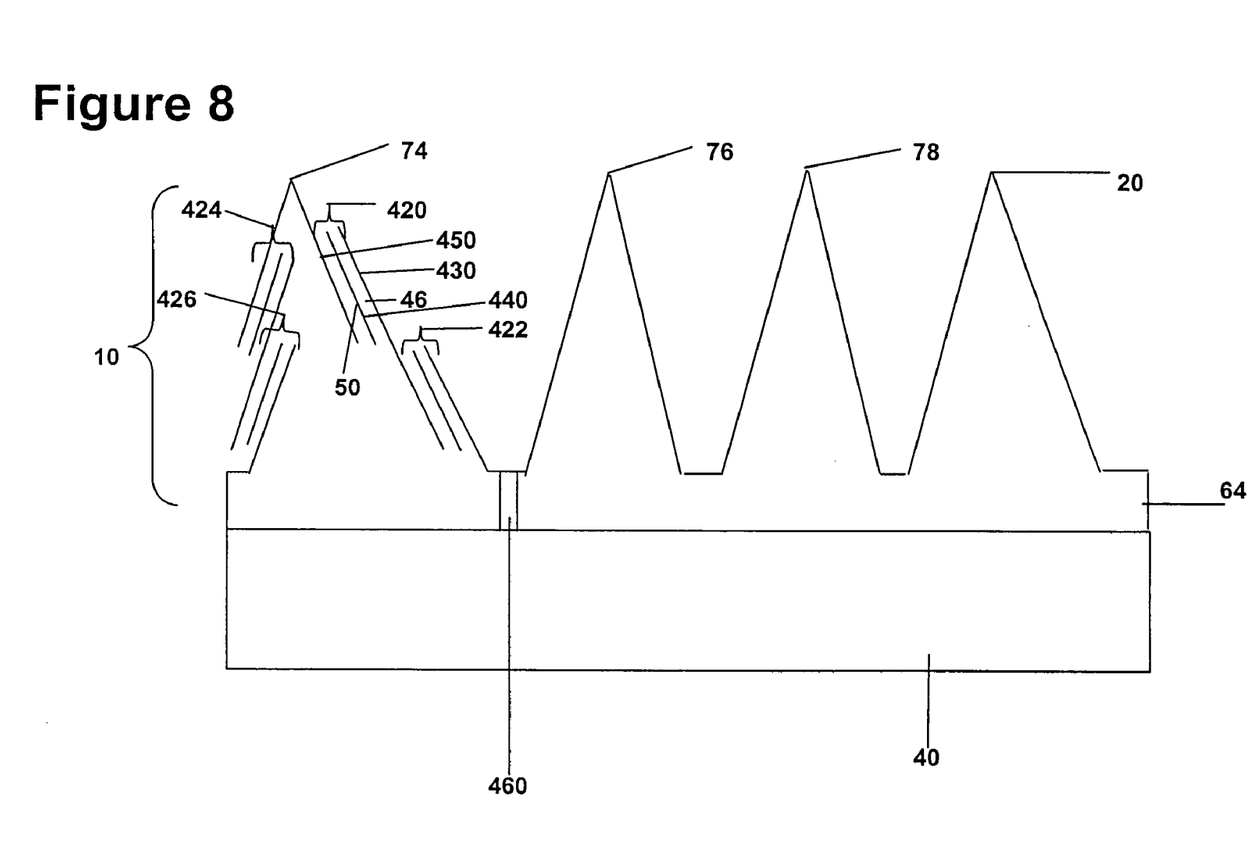
FIG. 8 is yet another embodiment of the integrated heat sink fuel cell assembly showing multiple fuel cells in each cooling fin.

FIG. 8 shows an alternate preferred embodiment in which the cooling fins (14, 16, 18, 20) of the integrated heat sink assembly (10) can contain multiple embedded fuel cells that are different from the previously mentioned fuel cells. Multiple embedded fuel cells are placed in each cooling fin. The cooling fin (14) has embedded fuel cells (420, 422, 424 and 426). Each embedded fuel cell is formed by placing a membrane electrode assembly.

FIG. 8 depicts that an embedded fuel cell (420) is created using a membrane electrode assembly (440) clamped between a pair of connector plates (430 and 450). The connector plates (430 and 450) serve to feed an anode (50) and a cathode (46). The connector plates (430 and 450) are contemplated to be made from an electrically conductive material, such as a metal or metal alloy, a carbon or carbon based material like graphite.

The series of connected fuel cells with multiple fins are connected together in series or parallel configuration through fin electrical separators (460). The fin electrical separators are preferably made from a non-porous and optionally electrically conductive material, depending on the design specification. The fuel cell anodes are preferably connected to the fuel plenum (64). The overall device (10) continues to serve as a heat sink to dissipate heat from heat source (40) while providing a structure for the integration of multiple fuel cells.

The invention with respect to fuel cells has air breathing cathodes integrated into the cooling fins of the heat sink. This design has the advantage of providing an air breathing fuel cell without the added volume of the fuel cell in the electronic package.

The invention permits the process heat to be dissipated through the fuel cell—heat sink device and used to advantage in the fuel cell itself. For example, the heat of the electrical device could be used to drive the fuel processor, activate fuel storage, or to maintain the fuel cell itself at an elevated temperature. The heat can be used to maintain the fuel cell at an elevated temperature relative to the environment. Maintaining an elevated temperature is potentially useful for employing alternative electrolyte chemistries in using non-noble metal catalysts and for maintaining product water in a vaporized (non liquid) state. The fuel cells operate under 90 degrees Celsius but in some cases are able to operate at temperatures as high as 180 degrees Celsius.

In addition to the integration of a fuel cell into the heat sink to provide electrical power, the invention includes the integration of ancillary system functionality into the overall heat-sink format.

The exact configuration of fuel cell, ancillary systems and heat sink will vary. By altering the dimensions of the heat sink, sufficient cathode area can be created to generate enough power to supply electricity needed to drive an electrical device.

For example, a typical heat sink for a modern CPU has approximate dimensions of 7.5 cm×7.5 cm×5.0 cm with twenty-four cooling fins. Each cooling fin preferably has a surface area of 22.5 $cm^2$. Under nominal fuel cell operating conditions of 100 mw/$cm^2$, each fin can produce potentially 2.25 watts of power, for a total power output of the fuel cell of 54 watts. The total power output of the fuel cell can be increased with pressurized operation and with active air movement over the cathodes as might be facilitated by certain heat sink designs.

The example given includes only macroscopic dimensioned fuel heat sink structures. As the cooling fins of a heat sink become smaller, moving to micro-scale dimensions, the potential power density available from the heat device increases dramatically. As the power produced by the heat sink increases, the heat generated from the powered electrical device becomes a lower fraction of the overall heat generated and therefore become parasitic on the thermal load of the fuel cell itself. In this case, even though the fuel cell system does not benefit from the thermal waste of the electrical circuit, the overall system enjoys improved efficiency by the integration of the multiple thermal loads into one place.

In either case, whether there is a thermal advantage or not, the integration of the fuel cell into the heat sink device provides an overall reduction in system volume, freeing up weight and space for fuel storage, eventually improving the overall performance of the device being powered by the fuel cell.

One of the benefits of the invention is to make use of waste heat from a chip or heat source being cooled, for the purpose of assisting in providing electrical power. A further benefit is the integration of the fuel cell power source with the heat sink to make use of the air flow for both cooling and power generation. Another benefit is the creation of a compact power source by integrating the fuel cell into the heat sink.

While this invention has been described with emphasis on the preferred embodiments, it should be understood that within the scope of the appended claims, the invention might be practiced other than as specifically described herein.

What is claimed is:

1. An integrated heat sink fuel cell assembly comprising:
   a. a heat sink assembly comprising a base and at least one cooling fin extending from the base;
   b. at least one connector extending from the heat sink assembly to a heat source; and
   c. at least one fuel cell comprising a cathode and an anode integrally disposed within a single cooling fin and between the cathode and the anode is an electrolyte.

2. The integrated heat sink fuel cell assembly of claim 1, wherein the heat sink assembly with the cooling fin is positioned to interact with air to dissipate heat.

3. The integrated heat sink fuel cell assembly of claim 2, wherein the cathode is disposed within the cooling fin to interact with the air.

4. The integrated heat sink fuel cell assembly of claim 1, further comprising an active air moving device connected to the heat sink assembly for increasing air flow over the cooling fin and cathode.

5. The integrated heat sink fuel cell assembly of claim 1, wherein the active air moving device is selected from the group: a fan and a heat pump.

6. The integrated heat sink fuel cell assembly of claim 1, wherein the fuel cell further comprises:
   a. a plurality of cooling fins connected to the base with at least one fuel cell in each cooling fin, wherein each fuel cell in each fin comprises an anode and a cathode separated by a channel and electrolyte is disposed in the channel; and
   b. a fuel plenum is in communication with the anode and within the heat sink assembly, and an oxygen source is in communication with the cathode.

7. The integrated heat sink fuel cell assembly of claim 1, wherein the cathode is mechanically secured to the cooling fin with a bolt.

8. The integrated heat sink fuel cell assembly of claim 1, wherein the electrolyte is contained in a membrane assembly.

9. A method for making an integrated heat sink fuel cell assembly comprising the steps of:
   a. providing a heat sink assembly having a base and a cooling fin extending from the base;
   b. creating a channel having a first wall and a second wall in a single cooling fin;
   c. forming an anode in the first wall and a cathode in the second wall using a catalyst;
   d. connecting the anode to a fuel plenum and the cathode to an oxygen source; and
   e. disposing an electrolyte in the channel between the anode and the cathode.

10. The method of claim 9, further comprising the step of forming the anode and the cathode in the first and second walls by embedding catalyst in the first and second walls.

11. The method of claim 9, wherein the channel is created using a method selected from the group consisting of etching, embossing, laser cutting, water jet cutting, micro molding, LIGA processing, deep reactive ion etching, electro discharge machining, powder packing, and combinations thereof.

12. A method for making an integrated heat sink fuel cell assembly comprising the steps of:
   a. providing a heat sink assembly having a base having at least one cooling fin comprising a first side and a second side within a single fin wherein the fin extends from the base;
   b. forming an anode on the first side;
   c. attaching a membrane assembly having a top and a bottom to the anode, wherein the bottom of the membrane assembly attaches to the anode;
   d. attaching a cathode to the top; and
   e. connecting the anode to a fuel plenum and the cathode to an oxygen source.

13. The method for making an integrated heat sink fuel cell assembly of claim 12, wherein the membrane assembly comprises:
   a. a first seal;
   b. a second seal;
   c. a first gas diffusion electrode;
   d. a second gas diffusion electrode; and
   e. an electrolyte.

14. A heat sink assembly for a heat source comprising:
   a. a heat sink adapted for contacting the device, having a base and at least one cooling fin extending upwardly from the base;
   b. at least one connector extending from the heat sink assembly to the heat source; and
   c. at least one fuel cell comprising a cathode and an anode integrally disposed within the cooling fin, wherein the fuel cell comprises: an anode, a cathode and an electrolyte.

15. The heat sink assembly of claim 14, wherein the heat source is selected from the group consisting of an electronic device, a motor, a transformer, and a solenoid.

16. The heat sink assembly of claim 14, wherein the device is selected from the group consisting of an electronic device, a motor, a transformer, and other heat generating devices.

* * * * *

UNITED STATES PATENT AND TRADEMARK OFFICE
CERTIFICATE OF CORRECTION

PATENT NO. : 7,205,057 B2  Page 1 of 1
APPLICATION NO. : 10/780970
DATED : April 17, 2007
INVENTOR(S) : McLean It is certified that error appears in the above-identified patent and that said Letters Patent is hereby corrected as shown below:

In column 3, line 63, delete "perflurosulfonated" and insert -- perfluoro sulfonated --, therefor.

In column 3, line 66, delete "sulfonaated" and insert -- sulfonated --, therefor.

In column 3, line 67, delete "electroyte" and insert -- electrolyte --, therefor.

In column 4, line 21, delete "(46 and 48)." and insert -- (45, 46 and 48). --, therefor.

In column 4, line 36, after "a catalyst" insert -- . --.

Signed and Sealed this

Tenth Day of July, 2007

JON W. DUDAS
*Director of the United States Patent and Trademark Office*